May 26, 1959 D. M. LIPKIN 2,888,637

RADIO FREQUENCY OR CARRIER TYPE TRANSVERSE MAGNETIC AMPLIFIER USING SQUARE-WAVE POWER

Filed March 17, 1955 2 Sheets-Sheet 1

INVENTOR.
DANIEL M. LIPKIN
BY
Charles C. English
AGENT

May 26, 1959 D. M. LIPKIN 2,888,637

RADIO FREQUENCY OR CARRIER TYPE TRANSVERSE MAGNETIC AMPLIFIER USING SQUARE-WAVE POWER

Filed March 17, 1955 2 Sheets-Sheet 2

INVENTOR
DANIEL M. LIPKIN

BY *Charles G. English*
AGENT 2,888,637
Patented May 26, 1959

2,888,637

RADIO FREQUENCY OR CARRIER TYPE TRANSVERSE MAGNETIC AMPLIFIER USING SQUARE-WAVE POWER

Daniel M. Lipkin, Philadelphia, Pa., assignor to Sperry Rand Corporation, New York, N.Y., a corporation of Delaware Application March 17, 1955, Serial No. 494,947

5 Claims. (Cl. 323—89)

The present invention concerns transverse magnetic amplifiers and in particular such amplifiers employing square wave power.

It is an object of the invention to provide a simple transverse magnetic amplifier.

It is an object of the invention to provide a transverse magnetic amplifier the output of which at least approximates a square wave.

It is an object of the invention to provide a simple transverse magnetic amplifier in which the normal explanation of exponential decay of the output voltage is modified so as to have a characteristic approximating to some degree that of a square wave. Square wave power produces an increased movement of the saturated flux in response to movement of the resultant field, when operating in the region of vanishing rotational hysteresis. In addition, the cycle of operation may be predicted with less complexity and such devices operate with greater efficiency.

Copending application Serial No. 494,903 for "Transverse Magnetic Amplifier," filed March 17, 1955, is referred to for a detailed discussion on transverse magnetic amplifiers in connection with the present invention.

Reference is made to the above-identified application for background on the magnetic core material, as well as a discussion of the theory of operation and construction of transverse magnetic amplifiers in various forms.

In the drawings like numerals refer to like parts throughout.

The basic considerations concerning transverse devices comprising the present invention may be formulated as follows:

(1) Transverse fields are in general applied to a core of ferromagnetic material simultaneously. It may be noted that the B—H relationships are quantitatively unknown except under the conditions to be described below.

(2) It is possible by means of the invention to obtain quantitatively predictable B—H relationships in transverse core structures, consisting in the resultant B vector being a simple mathematical function of the resultant H vector.

(3) The above is accomplished by observing strictly the condition that the scalar magnitude of the vector resultant magnetizing force be kept above a predeterminable level characteristic of the magnetic material.

(*a*) When the above condition is met, the vector flux density $\vec{B}$ is substantially given by the vector equation:

$$\vec{B}=\frac{Bs\vec{H}}{h} \tag{1}$$

where: B*s* is the saturation flux density magnitude for the material; $\vec{H}$ is the resultant magnetizing force vector in the material; and *h* is the scalar magnitude of $\vec{H}$. The above equation states that $\vec{B}$ is in the same direction as $\vec{H}$ and has the fixed magnitude B*s*. This relationship is justified and occurs when the above condition is satisfied.

(*b*) When Equation 1 is satisfied, the core itself does not absorb or store energy even temporarily, but merely serves to transfer energy between the sources of the transverse fields, yielding loss-less operation.

(4) Condition 3 above is met by having at least two transverse fields satisfying the condition:

$$h \geqq hp \tag{2}$$

where: *hp* is the predeterminable level referred to in 3 above.

(5) In a practical embodiment, a transverse magnetic structure, constructed in accordance with the foregoing considerations, would comprise a body of magnetic material having magnetizing means associated therewith and adapted to impress mutually orthogonal fields on the said body. An output effect may be produced from such a transverse structure by varying the magnitude of at least one of the transverse fields and, so long as the condition represented by Equation 2 is satisfied, the operation of the device will be substantially loss-less.

Figure 1:
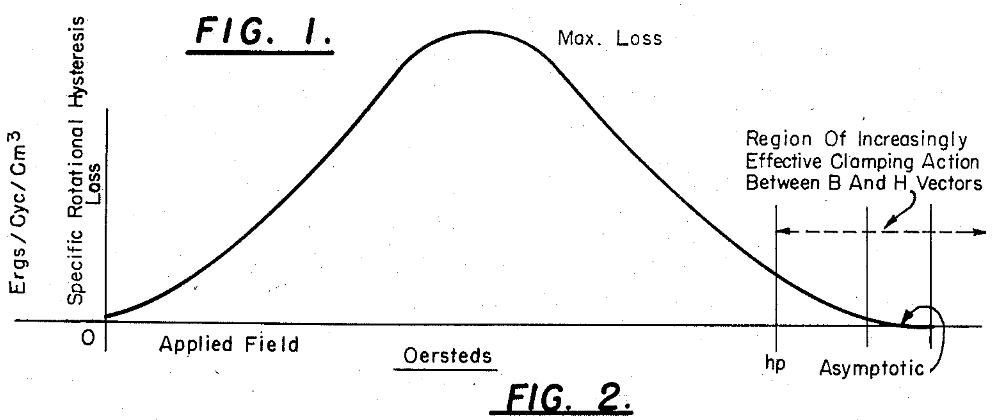
Figure 1 is a diagrammatic showing of a loss diagram for a hysteresis core over a wide range of magnetic field with particular reference to the region of "vanishing rotational hysteresis."

(6) The predeterminable level *hp* referred to above may be taken to be that value of magnetizing field larger than the value at which the specific rotational hysteresis loss for the material peaks (see Figure 1) and for which the specific rotational hysteresis loss is appreciably less than said maximum rotational hysteresis loss.

It will be seen from the above, as well as from my aforementioned prior copending application Serial No. 494,903, that the mutual inductance is not the result of a single field, but is produced by the oscillation of $B_S$ due to the interaction of the two fields and the change in the resultant super-saturating magnetization field with its effect on $B_S$.

Figure 2:
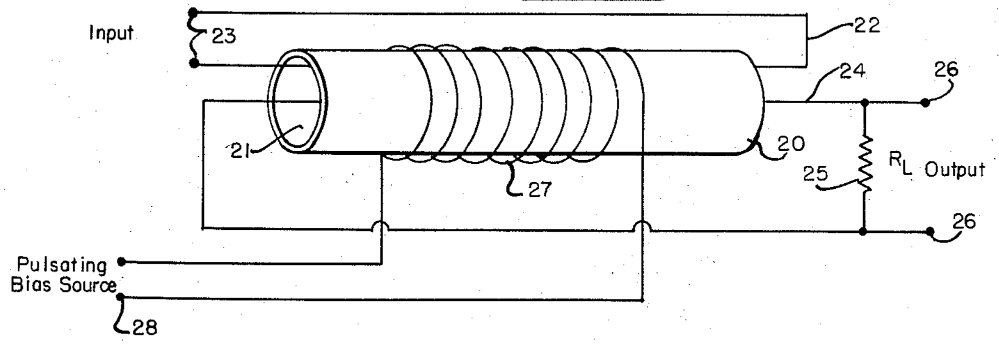
Figure 2 is a schematic diagram of one form of transverse magnetic amplifier without accessories.
Figures 3, 4:
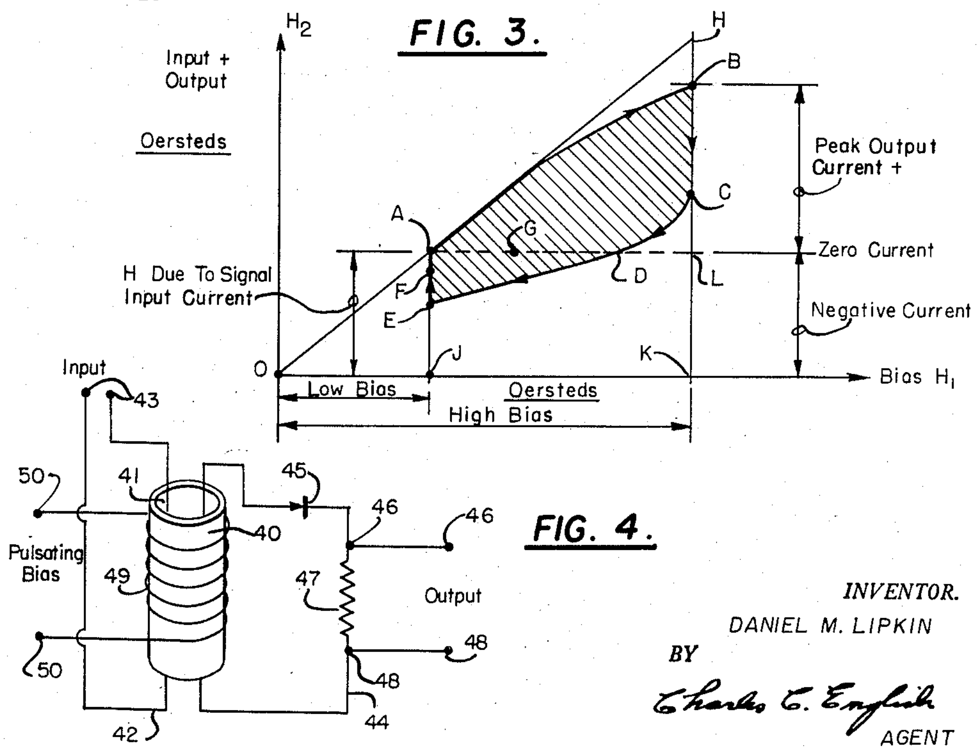
Figure 3 is an H—H diagram of one possible sequence of operation of the transverse magnetic amplifier of Figure 2.
Figure 4 is a schematic diagram of another form of transverse magnetic amplifier employing a pulsating bias current source.

In Figure 2 an elongate ferro-magnetic core 20 is provided with a central channel 21 threaded by an input winding 22 provided with input terminals 23. An output winding 24 also threads central channel 21 and is provided in its circuit with a load resistance 25 across the terminals of which are connected output terminals 26. A combined D.C. bias and auxiliary pulsating power source winding 27 is wound around the outside cylindrical portion of the core and provided with power terminals 28. The input current may be thought of as maintained constant by the input source at terminals 23 despite the fact that the entire output electromotive force appears as well in the signal circuit. This represents an unsatisfactory feature which can be improved by using two cores in such a way that the electromotive forces picked up in the signal windings of the two cores will substantially cancel. Power is supplied to the amplifier of Figure 2 by a pulsating bias source applied to terminals 28 which magnetizes the core everywhere transversely to the directions in which the current flowing in the input winding 22 magnetizes the core material. The pulsating bias current flowing in winding 27 does not reverse sign and is preferably designed so that the smallest magnitude is always large enough to maintain the core materials strongly saturated and in that portion of the curve of Figure 1 which is to the right of the maximum. The field magnitude necessary to maintain the core material in the region of vanishing rotational hysteresis or diminishing rotational hysteresis will of course depend upon the characteristic hysteresis loop of the particular core material employed, as discussed above. The pulsating bias current is supplied from what should be very nearly a power supply current-source and is essentially a direct current on which there is superimposed a sinusoidal or square wave current of a definite frequency. For the purposes of the following analysis, this superimposed current will be taken to be a square wave in the form of pulses. With the assumption of "square wave power" applied to the terminals 28, the transverse bias current supplied by the auxiliary bias source and flowing in winding 27 continually pulsates between two levels, both of the same sign and both preferably large enough to saturate the core, as discussed in detail in connection with Figure 1A. The ratio of the "high bias" to the "low bias" should preferably be as large as possible where the device is to be employed as an amplifier. The operation of this type of amplifier may be conveniently illustrated by an "H—H" diagram such as shown in Figure 3, in which the two transversely acting magnetizing forces are plotted as coordinates of a graph and are shown as $H_1$ and $H_2$ respectively. The field $H_1$ indicated as the bias field and shown as effectively the X axis of Figure 3, is that produced by the current flowing in winding 27. The input-output field $H_2$ shown as corresponding to the Y axis of Figure 3 is produced by the current flowing in the windings 22 and 24. It should be noted that although in Figure 2 the windings 22 and 24 are shown as a single wire, as many turns may be employed as good design in this type of device may indicate or require. The paths followed by the core material in such a diagram in the course of time, or cycle by cycle, indicate what is happening in the amplifier.

One form of the loop of operation of the particular material making up the core 20 may be taken as follows for illustrative purposes. If we assume that the input H value JA on Figure 3 which is the field resulting from the current flowing in input winding 22 is first established, while the bias applied to terminals 28 is at its low value OJ, when the bias OJ is stepped up to its high value OK along the X axis, the point representing the state of the core in the H—H diagram will follow some path such as AB and approximating the straight line AH. In any event, the path will lie within the angle HAL of Figure 3 because only those directions lying within this angle correspond to the decreasing "vertical" in the diagram component of the magnetization vector B which is consistent with the positive output current in a resistive load such as 25 of Figure 2. The vertical H value KB is made up of the constant input JA and the output LB. Now, in the period when the high bias is maintained, the output LB will tend to decay exponentially to zero and will reach some value LC just before the bias at terminals 28 is stepped. While the bias is switching back to its low value, the output current in load resistor 25 will reverse and the point representing the state of the core 20 in the diagram will traverse some such path as CDE. When the output current passes through zero at D, as indicated by the dotted line AL, the rate of change of magnetization with respect to time *dB/dt* must be zero. It follows that the path CDE must be tangent to the line OD because only for motion of the representative point toward or away from the origin in the diagram will the derivative, *dB/dt*, vanish. After passing D, the path must lie within the angle ADO because only in such directions does the rate of change of the vertical component of the magnetization vector B have the algebraic sign opposite to that of the output current.

Next, as the bias at output terminals is maintained at low value, the negative output current AE, as indicated in Figure 3, tends to decay to the value AF and will reach the point F just before the pulsating bias at terminals 28 again switches to the high bias value. One of the important things to note is that for the second such cycle of operation the starting point will be F in Figure 3 rather than A and this will lead to a smaller output for the second cycle. In fact it can be seen that the state of affairs existing for the first cycle is one in which the average output current through load resistor 25 over the cycle is not zero but positive. Such a state of affairs could not recur indefinitely because one cannot maintain a unidirectional current in a symmetrically conducting circuit such as the output circuit by means of pure conductive coupling of energy to that circuit, for example the magnetic core 20. The first cycle therefore represents a transient state in the steady state condition. The positive peaks of output current will have the same orders of magnitude as the negative peaks, for example LB, and AE will tend to have a ratio well removed from unity, but the current represented by or producing AE is smaller than AJ. Therefore the steady state condition will be marked by a low current gain which may even be less than 1. One solution to this situation is shown in Figure 4 where an elongate core of magnetic material 40 is provided with a central channel 41 threaded by an input winding 42 provided with input terminals 43. An output winding 44 also threads central channel 41 and contains in a circuit a diode 45, the cathode of which is connected to one terminal 46 of a load resistor 47, the other terminal 48 of which is connected to the anode of diode 45. The terminals 46 and 48 are the output terminals for the device. The cylindrical body of the core 40 is surrounded on the outside by a winding 49 having terminals 50 to which is applied a saturating pulsating bias current. As suggested above, the steady state low current gain which may be less than unity is corrected by placing the diode 45 in the output circuit 44 in series with load resistor 47. The diode 45 functions to block negative output currents and allows the output current to have a non-zero average in the steady state condition.

In Figure 4 when the bias in winding 49 is switched from the high value to the low value shown in Figure 3, along with the X axis, the core material 40 will traverse the path CDGA in Figure 3 because the diode 45 cuts off at D and prevents the output current from going negative. Thus, whenever the bias at terminals 50 is switched from the low to the high value, the core material 40 starts out from a state A determined by the input signal at terminals 43. The output current in load resistor 47 now has the character of a repeated transient as in the case of the self-saturating ordinary magnetic amplifier.

Figure 5:
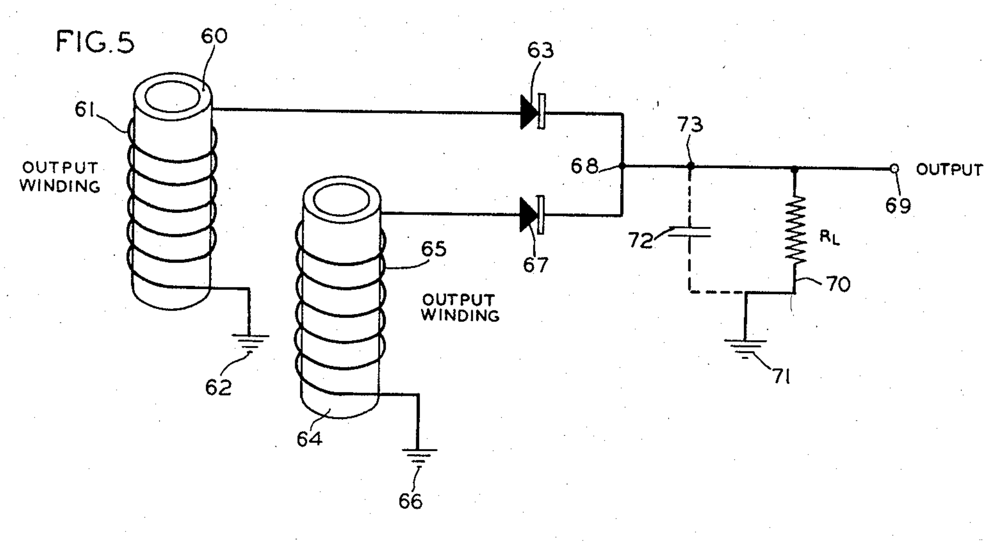
Figure 5 is a partial schematic diagram, with parts omitted for simplicity, of a full waveform of transverse magnetic amplifier with diode.
Figure 6:
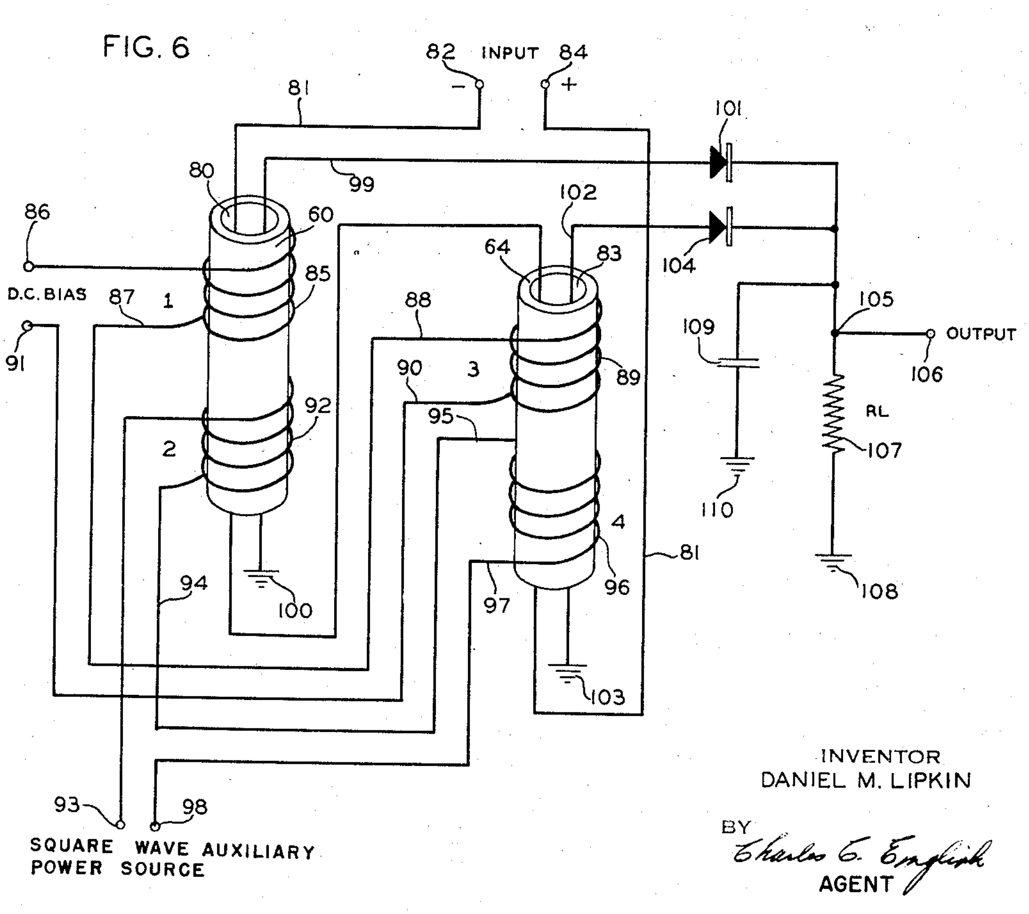
Figure 6 is a schematic diagram of one form of full wave transverse magnetic amplifier yielding an output wave characteristic sufficiently resembling that of a square wave so that it can be utilized as an input for other elements employed in combination with it in a digital computer or like device.

Figure 5 shows a simplified representation of a full wave form of a transverse magnetic amplifier with diode, in which the output windings on two cores are connected to the load as shown. Only the output windings have been shown for purposes of simplicity. The partial representation comprises a first core 60 provided with an output winding 61 having one terminal grounded at 62 and the other terminal connected to the anode of diode 63. A second core 64 is supplied with an output winding 65 grounded at 66 and connected to the anode of a diode 67. The cathodes of diodes 63 and 67 are connected at junction 68. Junction 68 is connected to junction 69 with one terminal of a load resistor 70, the other terminal of which is grounded at 71. Junction 69 serves as an output terminal. A filtering capacitor 72 may be inserted at 73 between junction 68 and 69 and grounded at 71. The electromotive forces in the two output windings 61 and 65 should be out of phase, for example, one is the negative of the other, because then the induced electromotive forces in the signal circuits not shown of the two cores will cancel. The cancellation is accomplished by having the biases in the two cores vary in opposite directions. This requires that the bias source be split into two separate sources, for example a direct current bias source and one which supplies sine waves or square waves. Where square waves are employed, a device such as that shown in Figure 6 results. It will be seen that Figure 6 is substantially the circuit of Figure 5 with the signal circuits added. A first core 60 is provided with a central channel 80 through which is threaded an input winding 81 having a negative input terminal 82. A second core 64 is provided with a central channel 83. The input winding 81 threads channel 83 and returns to the positive input terminal 84. A D.C. bias winding 85 surrounds the outer circumference of core 60 and is provided with a terminal 86. The other terminal 87 of winding 85 is connected to terminal 88 of bias winding 89 wound on the outer circumference of core 64. The other terminal 90 of winding 89 is connected to the second D.C. bias terminal 91. It will be seen that windings 85 and 89 are connected in series. An A.C. bias winding 92 is wound on the outer periphery of cylindrical core 60 and has one terminal connected to an A.C. bias terminal 93. The other terminal 94 of winding 92 is connected to terminal 95 of a bias winding 96 wound around core 64. The other terminal 97 of winding 96 is connected to the other A.C. bias terminal 98. Output winding 99 threads channel 80, has one end grounded at 100 and the other end connected to the anode of diode 101. A second output winding 102 threads central channel 83 of core 64, is grounded at 103 and connected to the anode of diode 104. The cathodes of diodes 101 and 104 are connected to junction 105 with output terminal 106 and one terminal of load resistor 107, the other terminal of which is grounded at 108. A filter condenser 109 is connected between junction 105 and ground 110. Condenser 109 as well as condenser 72 in Figure 5 shunt the load to smooth and filter the output signal. It should be noted in connection with the structure of Figure 6 that the amplitude of the alternating bias current is such that the total bias including the D.C. bias never changes sign in either of the cores 60 or 64 and remains at all times of sufficient value to saturate both cores strongly and maintain them in the region of vanishing rotational hysteresis discussed in connection with Figure 1. Also the direction of the relative winding of coils 89 and 96 is opposite to the winding of coils 85 and 92. This arrangement insures that the total biases of the two cores will vary out of phase.

The operation of Figure 6 may be summarized as follows:

(1) Apply D.C. bias at terminals 86 and 91;

(2) Apply auxiliary square wave power at terminals 93, 98;

(3) Apply an input current at terminals 82, 84;

(4) Input at 82, 84 produces pulses at 99 and 102 which alternate in time and appear at the output 106;

(5) Condenser 109 filters the output;

(6) The combination of condenser 109 and diodes 101 and 104 gives an envelope having substantially the same waveform as the input current but possessing a higher power level, i.e. amplifier.

While there have been described above what are at present believed to be the preferred forms of the invention, other forms will suggest themselves to those skilled in the art. All such variations are intended to be covered by the generic terms employed in the attached claims.

I claim:

1. The combination in a transverse magnetic amplifier with square wave power comprising a first core of ferromagnetic material, a direct current bias winding on said core, means for supplying direct current to said bias winding, an auxiliary winding on said core so positioned that the field produced thereby can aid the field produced by said bias winding, a square wave auxiliary power source connected to said auxiliary winding, a signal input winding positioned on said core orthogonally with respect to said bias and auxiliary windings, an output winding on said core, means to apply an input current to said signal input winding, the resultant magnetizing field from said three windings being of sufficient size always to maintain said core fully saturated in a selected polarity during operation of said amplifier, and being of sufficient size to carry said core material into the region of vanishing rotational hysteresis loss and effective clamping action between said resultant magnetizing field and the resultant fully saturated magnetic flux, said resultant magnetic field causing said resultant fully saturated magnetic flux of substantially constant magnitude to change its vector position thereby to induce a signal output in said output winding, an envelope producing filter circuit means connected to said output winding, a second core of ferromagnetic material, a direct current bias winding on said second core connected in series with said first bias winding, a square wave auxiliary winding on said second core connected in series with said first square wave auxiliary winding, an input winding on said second core orthogonally positioned with respect to the bias and auxiliary windings thereon, and an output winding on said second core.

2. The combination set forth in claim 1, said two output windings being connected together via rectifier means to a single output terminal, said envelope producing filter circuit means comprising a condenser.

3. In combination in a radio frequency transverse magnetic amplifier with square wave power, first and second cores of ferromagnetic material, direct current bias windings connected in series with one another and carried by said cores respectively, means coupled to said series connected bias windings to supply direct current bias to said bias windings, auxiliary windings connected in series with one another and carried by said cores respectively, said auxiliary windings being so wound on said cores that fields produced thereby are additive to those produced by said bias windings, a square wave pulsing power source connected to said series connected auxiliary windings, first and second signal windings connected in series with one another carried by said first and second cores respectively, each of said signal windings being positioned transversely with respect to the bias and auxiliary windings carried by said cores, means to supply input signals to said series connected signal windings, the resultant magnetic field produced by the combined actions of the currents in said windings being one that rapidly shifts in position and has a magnitude sufficiently great always to maintain both said cores fully saturated and to carry the core material of both said cores into the region of vanishing rotational hysteresis loss and effective clamping action between the resultant magnetic field and the fully saturated resultant magnetic flux of substantially constant magnitude, whereby said fully saturated resultant flux in each of said cores rotates with said resulant field in each of said cores, and output winding means carried by both said cores whereby output signals are induced in said output winding means by said moving resultant fully saturated magnetic flux in each of said cores.

4. The combination set forth in claim 3, wherein said output means comprises separate windings carried by said first and second cores and connected in parallel to a common output terminal, and filter circuit means connected between said separate output windings and said common terminal.

5. The combination of claim 3 wherein said output winding means comprises first and second output windings carried by said first and second cores respectively, both said output windings being positioned transversely to said bias and auxiliary windings on said cores, load means, and first and second rectifier means respectively coupling said first and second output windings to said load means.

References Cited in the file of this patent

UNITED STATES PATENTS

| | | |
|---|---|---|
| 1,287,982 | Hartley | Dec. 17, 1918 |
| 1,449,878 | Austin | Mar. 27, 1923 |
| 2,479,656 | Wiegand | Aug. 23, 1949 |
| 2,543,843 | Frosch | Mar. 6, 1951 |
| 2,741,757 | Devol et al. | Apr. 10, 1956 |

OTHER REFERENCES

Publication: "Non Destructive Sensing of Magnetic Cores," by D. A. Buck and W. I. Frank, Communications & Electronics, January 1954, pp. 822–830.